United States Patent [19]

Baraff et al.

[11] 4,413,883
[45] Nov. 8, 1983

[54] DISPLAYS CONTROLLED BY MIM SWITCHES OF SMALL CAPACITANCE

[75] Inventors: David R. Baraff, Ottawa; Nur M. Serinken, Kanata; Richard W. Streater, Nepean; Carla J. Miner, Nepean; Robert J. Boynton, Nepean; Blair K. MacLaurin, Nepean; William D. Westwood, Nepean, all of Canada

[73] Assignee: Northern Telecom Limited, Montreal, Canada

[21] Appl. No.: 212,271

[22] Filed: Dec. 3, 1980

Related U.S. Application Data

[63] Continuation-in-part of Ser. No. 44,247, May 31, 1979, abandoned.

[51] Int. Cl.³ .............................................. G02F 1/133
[52] U.S. Cl. ...................................... 350/334; 350/333
[58] Field of Search ............... 350/332, 333, 334, 339, 350/356, 357

[56] References Cited

U.S. PATENT DOCUMENTS 3,824,003  7/1974  Koda et al. ....................... 350/334
4,233,603  11/1980  Castleberry .................... 350/333 X

FOREIGN PATENT DOCUMENTS 52-149090  12/1977  Japan .............................. 350/339 R Primary Examiner—John K. Corbin
Assistant Examiner—David Lewis
Attorney, Agent, or Firm—Stuart L. Wilkinson

[57] ABSTRACT

A matrix multiplexed field effect display has switch devices at matrix crosspoints to provide a turn-on threshold for the field effect material. The switch devices are thin film metal-insulator-metal (MIM) switches. The display is operated at low current so that the MIM switches, which may be deposited on glass, do not degrade rapidly in use.

24 Claims, 9 Drawing Figures

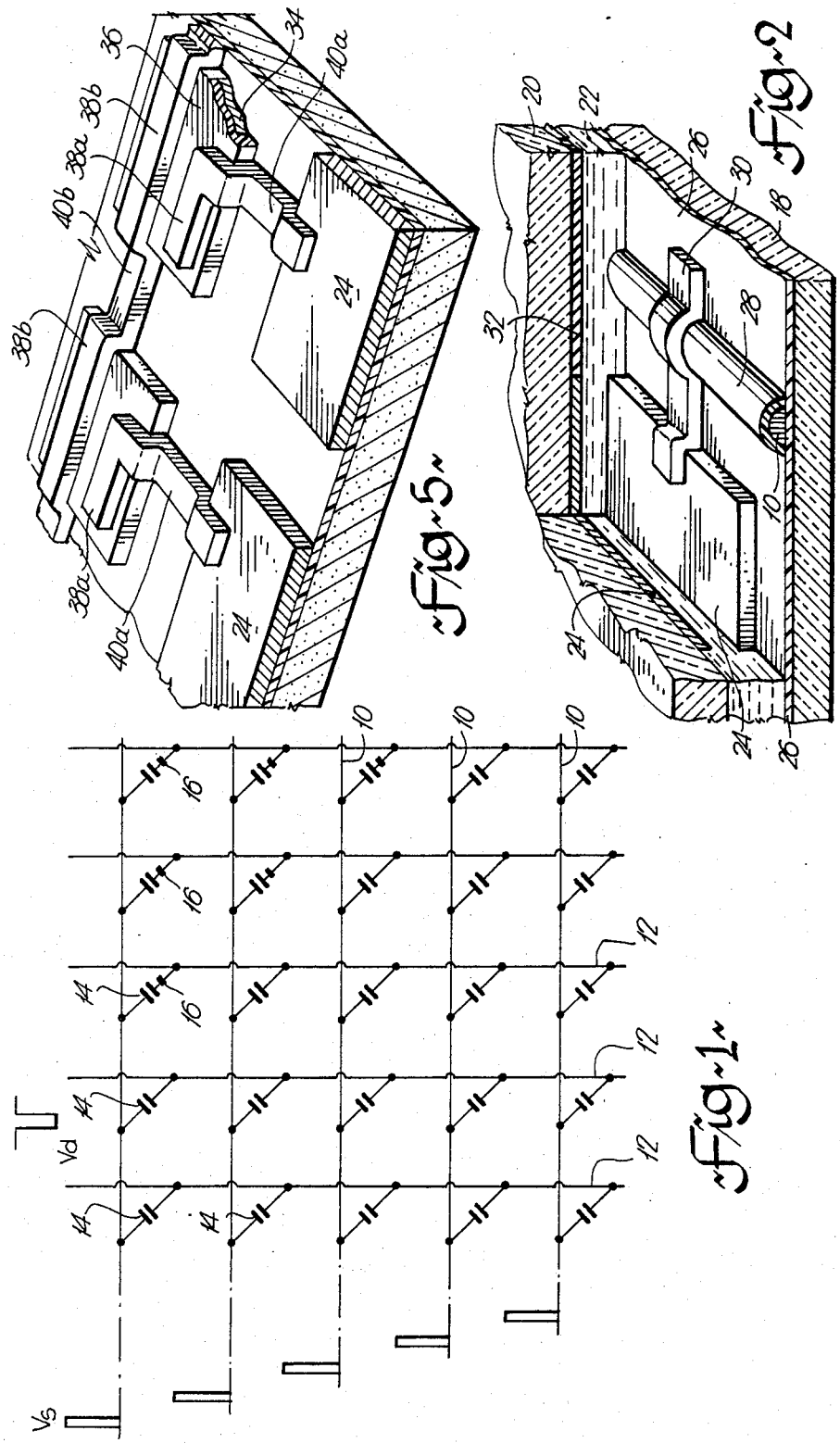

DISPLAYS CONTROLLED BY MIM SWITCHES OF SMALL CAPACITANCE

This application is a continuation-in-part of application Ser. No. 044,247 filed on May 31, 1979 now abandoned.

This invention relates to field effect display panels, specifically to such panels matrix multiplexed to a high level.

In a matrix multiplexed addressing scheme for a display panel, a series of scan pulses $V_s$ is, for example, applied sequentially to each of a series of row conductors, (scan lines), while a series of data pulses $V_d$ is applied to selected ones of a series of column conductors, (data lines). To turn on a picture element (pel), at a selected row and column intersection, the difference between $V_s$ and $V_d$ applied to the selected row and column respectively, is made great enough to locally alter the optical characteristics of an intervening field effect liquid, for example, a liquid crystal (LC) or electrophoretic medium.

Several factors combine to limit the number of lines that can be multiplexed in a field effect display such as a LC display.

Firstly, at the instant a pel is selected, other, non-selected pels in the selected column also experience a pulse $V_d$. For one address period, the rms voltage experienced by these pels is insufficient to turn them on, but if N pels in a column are switched on and off in a single field scan, a non-selected pel in that column will experience $V_d$ for N address periods. This may be enough to turn the non-selected pel on. It can be shown that the ratio of rms voltage experienced by a selected pel to that experienced by a non-selected pel is:

$$\frac{V_{rms} \text{ selected}}{V_{rms} \text{ non-selected}} = \sqrt{\frac{(V_s + V_d)^2 + V_d^2(N-1)}{(V_s - V_d)^2 + V_d^2(N-1)}}$$

As N increases, the ratio becomes smaller and, since field effect materials such as LC's do not have a sharp threshold distinguishing on from off, the contrast ratio between selected and non-selected pels becomes poorer. At a certain number of row conductors, the contrast ratio becomes unacceptable.

This problem is compounded for LC displays which have a narrow viewing angle. Also, since the electro-optic response of field effect materials is generally temperature dependent, then if a pel is to be off at $V_{non-select}$ at high temperature, and on at $V_{select}$ at low temperature, the difference between $V_{non-select}$ and $V_{select}$ must be greater than for constant temperature operation. For the above reasons, the known level of multiplexing displays is limited.

This problem can be alleviated by placing a controlling switch in series with each pel at the intersections of scan and data lines. In use, pulses $V_d$ do not activate the switch pel combination whereas a selection pulses $V_s + V_d$ do activate the switch whereupon the field effect material experiences voltage. In the case of LC's, such a switch should be symmetrical with respect to zero voltage since, for the purpose of preventing irreversible electro-chemical degradation of a LC, net dc bias should be avoided.

In its broadest aspect, the invention proposes the use of a thin film, metal-insulator-metal (MIM) device as a matrix display switch. MIM devices function by tunnelling or trap depth modulation. In the former, carriers pass through a thin insulator by field enhanced quantum mechanical tunnelling. In the latter, carriers are released from traps in the insulator as the field developed between flanking metal layers diminishes the potential barrier to current flow. Such devices are known which exhibit, in a switching regime, an increase of from 500 to 10,000 times the original current passed for a doubling of voltage. This turn-on is sufficiently sharp that for display purposes the number of multiplexed lines, compared to the number achieved when no switches are used, can be increased by at least a factor of 8. If, on the other hand, the number of multiplexed lines is maintained, then using MIM switches, a greatly increased viewing angle, contrast ratio and permitted temperature range can be obtained.

Thin film MIM switches may have insulators such as aluminum oxide, tantalum pentoxide, silicon nitride, silicon dioxide, and zinc oxide. The thickness of the dielectric layer determines the conduction process. Below 50-100 Angstrom units, electron tunnelling is possible; from 100 to 1000 Angstrom units, trap depth modulation conduction processes dominate. The metal of the MIM switch may be any material which forms an ohmic or weakly blocking contact.

Embodiments of the invention will now be described by way of example with reference to the accompanying drawings in which:

FIG. 1 shows in schematic form a matrix multiplexed addressing scheme for a field effect display;

FIG. 2 is a part-perspective, part-sectional view, not to scale of a part of a MIM switch controlled LCD using one form of MIM switch;

FIG. 5 is a part-perspective, part-sectional view, not to scale of the MIM switch controlled LCD of FIG. 3;

Figure 3:
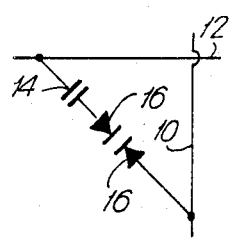
FIG. 3 shows in schematic form a LC pel controlled by a MIM switch configuration relatively independent of current polarity.

In a conventional matrix multiplexed addressing scheme for a liquid crystal display (LCD) as shown at bottom left in FIG. 1, a series of scan pulses $V_s$ are applied successively to row conductors 10 (scan lines), while a series of data pulses $V_d$ are applied to selected ones of a series of column conductors 12 (data lines). To turn on a LC pel 14 at a selected row and column intersection, the electric field produced by applying voltages $V_s$ and $V_d$ to the selected row and column respectively, is made great enough to locally change the optical characteristics of intervening LC and thus the transmissivity of the LCD in a manner known in the art.

As previously explained, since LC's do not have a sharp threshold distinguishing on from off, then a pel may turn on even though not specifically addressed because it experiences data pulses $V_d$ driving selected pels in the same column.

As shown at top right in FIG. 1, the invention proposes a LCD having a thin film MIM switch 16 in series with each LC pel 14.

Referring to FIG. 2, the LCD comprises a pair of glass plates 18, 20 with a layer of twisted nematic LC 22 sealed between them. The glass plates are polarizing plates having axes of polarization perpendicular to one another. The inner surfaces of the plates 18, 20 are treated in a manner known in the art so that in the absence of an applied electric field, LC molecules adjacent the two plates line up with the axis of polarization. The longitudinal axes of the LC molecules twist through a right angle across the thickness of the LC. By applying a voltage across selected regions of the LC layer, the LC can be caused to undergo localized molecular reorientation light passing into the LCD through one plate is polarized and then, at the other plate, is extinguished, the applied voltage thus reducing the optical transmissivity of the LCD. The pels are defined by a row-column array of indium tin oxide transparent electrodes 24 on the inside surface of plate 18 and by a corresponding array of transparent electrodes 24 on the inside surface of plate 20. A dedicated MIM switch is situated adjacent electrode 24 of each pel 14 on the plate 18.

To fabricate the MIM switches on the inside surface of plate 18, a thin film 26 of tantalum is sputter deposited and then thermally oxidized at 475° C. for 16 hours to protect the glass from subsequent etch steps. A second layer of tantalum is then sputter deposited and photodefined into row conductors 10 from 2 to 25 mils wide and running the breadth of plate 18. The conductors 10, parts of which function as terminals of the MIM switches may be locally reduced to 0.5 mils wide at active areas of the switches. The conductors are subsequently anodized in a weak citric acid solution with an anodizing voltage of 25-60 V to produce surface layers 28 of tantalum pentoxide which act as the insulators of the MIM switches. I-V characteristics of the MIM switches can be adjusted by performing the Ta sputter deposition in a nitrogen atmosphere of appropriate concentration.

Cross conductors 30 are then deposited over the tantalum pentoxide layers as distinct NiCr:Au regions 30 from 0.5 to 5.0 mils wide. Each region 30 overlies and electrically contacts an electrode 24. The active area of each MIM switch, typically 1.0 mil$^2$, is the region of overlay of a layer 28 and a region 30. Each MIM switch is thus series connected between one of the electrodes 24 and a tantalum conductor 10. The display is fabricated by sealing a twisted nematic liquid crystal layer between the glass plates 18 and 20 processed as described above. The electrodes 24 common to a particular column on the glass plate 20 are electrically connected by thin film conducting leads 32 which enable pulses to be selectively applied to LC pels 14 by applying data and scanning pulses $V_d$ and $V_s$ to the appropriate row conductors 10 on plate 18 and column conductors 32 on plate 20.

Other examples of MIM switch have insulators of tantalum oxynitride, aluminum oxide, silicon nitride, silicon dioxide, silicon oxynitride, silicon monoxide, and zinc oxide. Generally oxides of the valve metals make passable MIM switch insulators. Other examples of metallization are aluminum and chromium. The important performance characteristics of such switches are that they be prepared as thin film devices and that they function as a switch by virtue of field enhanced quantum mechanical tunnelling or trap depth modulation mentioned previously. Thus, in an alternative embodiment of the invention, the "metal" at one face of the MIM switch is conducting indium tin oxide which has the advantage of being inherently transparent and so does not significantly attenuate light transmitted through it. To take advantage of this property, another embodiment (not shown) uses a single thin film indium tin oxide region to function both as the LC electrode and one "metal" layer of the MIM switch. Other materials used in MIM switches, for example, NiCr+Au, which are effectively transparent when of the order only of a few tens of Angstrom units in thickness, can also be used as combined pel electrode and MIM switch metallization.

The particular thin film technique, (sputtering, chemical vapour deposition, vacuum evaporation, or anodization) used in the formation of MIM switch layers is chosen to be compatibile both with the material being formed and the glass substrate material. However anodization appears currently to be the simplest, least costly and most effective process for forming MIM switch insulators.

To achieve long lifetime from LC displays the LC should not experience any net d.c. bias. For this reason the polarity of the drive pulse is usually periodically reversed. In the MIM switch controlled LCD however the voltage pulse experienced by a LC pel is modified by the electrical response of the MIM switch. If the I-V characteristic of the individual MIM switches are not symmetric with respect to polarity then non-polar configurations of pairs of MIM switches may be fabricated instead at each pel site.

Figure 4:
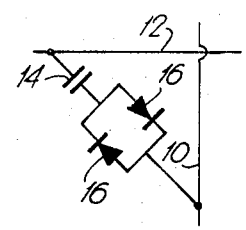
FIG. 4 shows in schematic form an alternative MIM switch for obtaining relative independence from current polarity.

Two non-polar configurations of MIM switch pairs are shown schematically in FIGS. 3 and 4, the diode representations of the MIM switches 16 being indicative of the asymmetry in the I-V characteristic of each MIM. In the FIG. 3 embodiment the I-V characteristic derives from the less conductive branch, while in the FIG. 4 embodiment the I-V characteristic derives from the more conductive branch. Various fabrication sequences can be readily derived from the previous description and one example for the FIG. 3 embodiment, is described in detail with reference to FIG. 5.

Referring in detail to FIG. 5, on the inside surface of glass plate 18 forming one flanking plate of a LCD, a thin film layer 26 of etch protectant is formed as described for the previous embodiment. A thin film of tantalum is then formed over the etch protectant and is photo-etched to produce regions 34 which are anodized to form surface layers 36 of tantalum pentoxide. A thin film layer of NiCr:Au is next formed on the substrate. From this layer, two pads 38a and 38b are photodefined on each region 34 to produce a structure equivalent to a pair of back-to-back MIM switches. Leads 40a and 40b are simultaneously and integrally formed with the pads 38. Each of the leads 40a extends between one of the regions 38a and the electrode 24 of that pel controlled by the MIM switch. Each of the leads 40b interconnects the pads 38 of those MIM switches in a particular column. As described with reference to the FIG. 2 embodiment, the number of process steps in the manufacture of the FIG. 5 LCD is reduced if pads 38, leads 40 and electrodes 24 on plate 18 are formed at the same time, as, for example, a transparent thin film of indium tin oxide.

In the FIGS. 3 and 4 embodiments the switch characteristics tend not to depend on current polarity since the device is symmetrical. In both cases, current experiences both a MIM switch and its inverted structure MIM switch.

Using MIM switches at matrix crosspoints, high level multiplexing of a matrix addressed array of LCD pels can be obtained with high contrast between selected and non-selected elements, and without the problem of greatly limited operating temperature ranges. MIM switches may be used both in transmissive and reflective displays. In the former case the MIM switch though it may be opaque is sufficiently small compared with the pel size that very little light is intercepted by the MIM switch when the LC is in its transmissive state.

Since the thin film MIM switches are only of the order of 1 micron thick, their presence on the transparent plate flanking the LC does not prevent the use of a correspondingly thin layer of LC as would thick film devices. In turn, and assuming the resistivity of the LC is very high, of the order of $10^{10}$ ohm-cm., then the charge through the MIM switches is limited by the LC resistance. Coupled with the fact that MIM switches used show their switching characteristics at very low currents, of the order of 10 microamps it will be appreciated that the MIM switches can be operated in a very low current regime which reduces the chance of their failing through excess heat dissipation. In the intended application to a large area (up to 9"×9"), high pel density (pel area less than 25 mil square) display, fabrication of the MIM switches offers significant cost benefits over thin film transistor switches since fabrication techniques for the latter are more complex and are characterized by poor yield. In addition, the fabrication techniques proposed are preferred to silicon IC techniques, again, because of cost and further because glass substrates can be readily obtained which are substantially larger in area, and considerably flatter than the largest available silicon wafers.

The deposition order described for the FIGS. 2 and 5 embodiments is as follows:

1. Etch stop deposition—$Ta_2O_5$ on soda lime glass substrate.
2. Ta deposited, photodefined and anodized.
3. NiCr:Au crossover layer deposited and photodefined.
4. Transparent pel electrode deposited.

Processing however is not confined to this particular order. If dry etching techniques are used, no etch stop layer need be deposited. Other possible processing sequences are listed briefly below.

A. Ta deposition—anodization—crossover deposition—pel electrode deposition.
B. Pel electrode deposition—Ta deposition—anodization—crossover deposition.
C. Ta deposition—pel electrode deposition—anodization—crossover deposition.
D. Ta deposition—anodization—pel electrode and crossover deposition (one step).

Also as indicated previously although currently it is found convenient to deposit MIM switch and addressing leads in an operation distinct from pel electrode deposition, the LC pel and its series connected MIM switch can have their common terminal deposited as a homogeneous transparent conducting layer, thereby reducing the number of processing steps.

Although not illustrated, MIM switches can be series connected to both electrodes of each pel, each pel thus having an associated thin film fabricated MIM switch on each of the plates 18 and 20. Alternatively there may be some advantage in fabricating a display with some MIM switches on one glass plate and other MIM switches on the other glass plate. When using opaque MIM switches for example, such an embodiment has the advantage of maximizing the area of each plate which can be devoted to pel electrode formation. Moreover from a production viewpoint the two glass plates flanking the LC can be processed identically.

Figure 6:
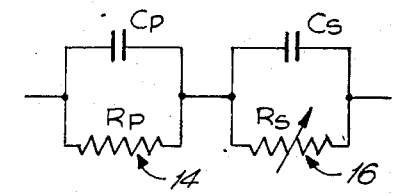
FIG. 6 shows in circuit schematic form of a MIM switch controlled LC pel.

Considering operation of the LCD illustrated in FIG. 2, a circuit equivalent of a liquid crystal pel 14 and its series connected MIM switch 16 is shown in FIG. 6. The liquid crystal pel 14 is represented as a resistance $R_p$ in parallel with a capacitance $C_p$ and the MIM switch is represented as a variable resistance $R_s$ in parallel with a capacitance $C_s$. The cell is driven by a voltage $V = V_s + V_p$ where $V_s$ is the voltage across the switch and $V_p$ is the voltage across the pel.

In time division multiplexing, the addressing period for each of N scan lines is T/N, where T is the total frame time. During this period (T/N<< for large N) selected pels are addressed with the full $V_s + V_d$ voltage. For the remainder of the frame, the "relaxation period", they see only the $\pm V_d$ data pulses applied to the other lines. The LC pel capacitance, $C_p$, must be charged through the MIM non-linear resistance $R_s$. In the voltage regime under consideration, $R_s$ is designed to be small for the selected pels and large for unselected pels. During the relaxation period the LC pel begins to discharge both through its own internal resistance $R_p$ and to the now parasitic capacitance $C_s$ of the MIM. In order to maintain as high an RMS voltage on the selected LC pel as possible, $R_p$ must be large and $C_s << C_p$. If $C_c$ is not small compared to $C_p$, the voltage division effect of the capacitors greatly reduces the effective voltage on the LC.

For flat plate capacitors of which the pel and the MIM switch are more-or-less examples:

C is proportional to A/l where A is the area and l is the spacing of the plates. The twisted nematic LC thickness is typically 10 microns and the thin film tantalum pentoxide insulator is typically 0.05 microns. Since the dielectric constants are similar, then if $(A/l)_p$ is to be very much greater than $(A/l)_s$, then $A_p/10$ is $>> A_s/0.05$. or $A_p >> 200 A_s$.

In order that the switch operates before its series connected pel and, more importantly, before unselected pels in the same column as the selected pel, the area of the MIM switch must be very much smaller than the area of the LC pel. This area is typically 1/1600 of the pel area.

Figure 7:
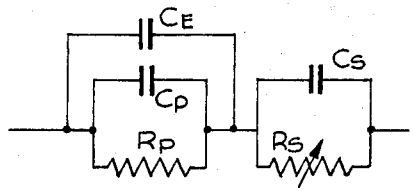
FIG. 7 shows in circuit schematic form an alternative to the MIM switch controlled LC pel of FIG. 6.

As an alternative to regulating the relative areas of the pel and its controlling MIM switch, extra capacitance $C_E$ can be introduced in parallel with the LC capacitance $C_p$ as shown schematically in FIG. 7. This arrangement is preferable particularly when the size of MIM switches needed to preserve the capacitance relationship discussed previously is approaching the limits of photolithographic resolution.

Following, several production sequences for practically realizing the FIG. 7 embodiment are described.

In a first method the dielectric of capacitor $C_E$ is $Ta_2O_5$ which has a high capacitance density so ensuring that capacitors $C_E$ occupy small areas of substrate and so do not materially reduce the substrate area available for pel electrodes.

Figure 8:
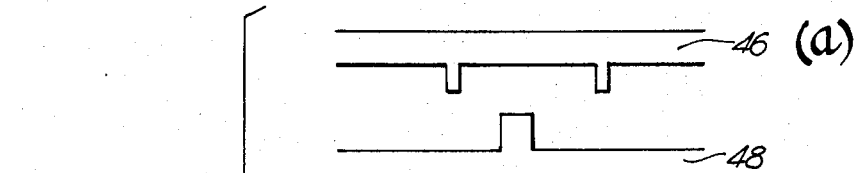
FIG. 8 shows a production process sequence for making a practical display embodying the MIM switch controlled pel of FIG. 7.

In addition to a MIM Ta line 46, a second $C_E$ line 48 is deposited parallel to each MIM line, (FIG. 8a). Using a mask, unshaded areas including regions 50, 52 are anodized, (FIG. 8b). If anodized separately, the $C_E$ oxide 52 may be made of thickness different from that of the MIM oxide 50. The $C_E$ tantalum interconnects are then etched away to leave the anodized oxide region 52 and a contact pad 54 (FIG. 8c). Additional dielectric is then deposited at regions 56 followed by top contact metallization regions 58 for the MIM switch and regions 60 connected to leads 62 for the capacitor $C_E$. The $C_E$ is connected into the pel circuit on subsequent deposition of the pel electrode 24 (FIG. 8e) and, after LCD packaging, by externally connecting the leads 62 to column electrodes 32 on the opposite plate 20 of the LCD. The dielectric region 56 is not required if capacitive crosstalk or leakage is small.

Although not specifically illustrated, the process step of anodizing through a mask can be avoided by depositing a layer of dielectric to function as the $C_E$ insulator at the same time as crossover isolation regions are deposited. Readily available dielectrics are of relatively low dielectric constant so large capacitors are required which may detract from the space available for pel electrodes.

In contrast to the two previous embodiments a large storage capacitor $C_E$ can be buried under the pel electrode 24. However, particularly for twisted nematic LC displays, the capacitor $C_E$ must be transparent which somewhat limits the materials which can be used.

Figure 9:
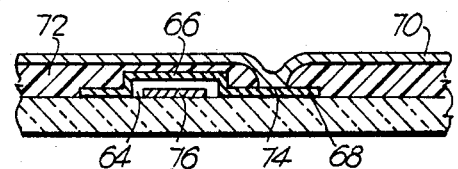
FIG. 9 shows in cross-section a buried MIM switch embodiment of the invention.

An advantage of the LCD-MIM switch combinations described previously is that the MIM switches are laterally offset from the LC pels 14 which they control. This means that the part of the LC layer 22 which undergoes a transmissivity change is located directly between the two glass plates 18 and 20 each of which is covered by a thin layer of oxidized tantalum and a thin film pel electrode 24. Thus the layer of liquid crystal 22 is nearly as flat as the surfaces of the underlying glass. Flatness if important is contrast variations are not to exist over the area of the pel. Such flatness is more difficult to achieve if the MIM switch and liquid crystal pel are superimposed as shown in FIG. 9.

As an alternative to the previous embodiments in which the MIM switch is offset from the pel electrode, the MIM switch 16 can be buried under the pel electrode 24. As illustrated in cross-section in FIG. 9, anodized tantalum regions 64 are overlain by interconnect metallization having contact pads 68. To keep the MIM switch area small compared to LC pel area, a pel electrode 70 is deposited through a via in a thick dielectric layer 72 to provide a top contact 74 for the MIM switch 16. A wholly transparent display can be obtained by using In:Sn:O or Cd:Sn:O instead of tantalum as bottom layer 76 and then depositing the MIM dielectric 64.

Fabrication of the MIM switches using thin film technology is considered to be advantageous since deposition of thin films permits the use of a thin twisted nematic LC which has a very low switching voltage. The threshold voltages of the MIM switches can be made correspondingly low which contributes to the overall display panel, although having many densely located pels, being a relatively low power device which can be driven using CMOS logic.

The embodiments described have been in terms of a transmissive display using a twisted nematic LC extending between crossed polarizing glass plates.

However the display can be made reflective by siting a reflecting sheet on the far side of the LC from an illuminating source. The glass plates confining the LC are made polarizing by the deposition of a thin polarizing film thereon.

Although twisted nematic LC's are preferred for the reasons discussed above, many liquids which can be stimulated to produce an electrical field related change in optical characteristics can be used in a MIM switch controlled matrix display. Thus, for example, the twisted nematic LC could be replaced by a dyed nematic phase transition LC in which crossed polarizers are unnecessary. Other guest-host LC's which function on the basis of anisotropic absorption of light by dichroic dyes will be familiar to those in the LCD display art. In addition, the liquid layer need not be a LC at all but could be an electrophoretic medium operating by field related movement of colloidal pigment particles.

What is claimed is:

1. A matrix multiplexed display comprising a pair of plates, at least one of the plates being transparent, the plates having sealed therebetween a layer of liquid characterized by electric field dependent optical transmissivity, a first plurality of electrodes on an inside surface of one plate and a second plurality of electrodes on an inside surface of the other plate, the display having a plurality of picture elements, each element defined by a pair of opposed electrodes on the inside surfaces of respective plates, means for applying a voltage between the opposed electrodes of each element, each picture element being series connected to a respective switch comprising a thin insulating film flanked by thin film conducting layers, the insulating film characterized by a gross change in resistivity at a predetermined voltage thereacross, the switches formed on the inside surface of at least one of the plates, each switch having a capacitance substantially less than the capacitance of its series connected picture element.

2. A matrix multiplexed display as claimed in claim 1 in which each switch is substantially smaller in area than the picture element controlled thereby.

3. A matrix multiplexed display as claimed in claim 2 in which each switch is laterally offset from the picture element controlled thereby.

4. A matrix multiplexed display as claimed in claim 2 in which each picture element and its series connected switch are superimposed, one picture element electrode having a part extending therefrom to provide a relatively small contact area with the switch insulating film.

5. A matrix multiplexed display as claimed in claim 1 in which on the inside of at least one of the plates, a thin film capacitor is formed in parallel with each picture element.

6. A matrix multiplexed display as claimed in claim 1 the picture elements and the switches being arranged in rows and columns, first lead means electrically connecting the thin film conducting layer at one side of each switch to an electrode of its series connected picture element, second lead means electrically connecting the thin film conducting layer at the other side of the switches in rows, and third lead means electrically connecting the electrodes on the other plate in columns.

7. A matrix multiplexed display as claimed in claim 1 in which the thin film conducting layer at said one side of each switch is formed as a single homogeneous substantially transparent layer with an electrode of its series connected picture element.

8. A matrix multiplexed display as claimed in claim 1 in which the insulating film of each switch is one of a group consisting of tantalum pentoxide, silicon dioxide, silicon oxynitride, silicon monoxide and zinc oxide.

9. A matrix multiplexed display as claimed in claim 1 in which the thin film conducting layer of at least one side of each switch is one of a group consisting of tantalum, aluminum, chromium, gold, indium tin oxide, and NiCr+Au.

10. A matrix multiplexed display as claimed in claim 1 in which each switch is a tantalum-tantalum pentoxide-gold device.

11. A matrix multiplexed display as claimed in claim 1 in which each switch is an aluminum-aluminum oxide-gold device.

12. A matrix multiplexed display as claimed in claim 1 in which the liquid is a liquid crystal.

13. A matrix multiplexed display as claimed in claim 12 in which the liquid crystal is a twisted nematic liquid crystal and the plates confining the liquid crystal are crossed polarizing plates.

14. A matrix multiplexed display as claimed in claim 12 in which the liquid crystal is in combination with a pleochroic dye.

15. A matrix multiplexed display as claimed in claim 1 in which said liquid is an electophoretic display medium.

16. A matrix multiplexed display as claimed in claim 1 in which said gross change in resistivity of said insulating layer results from a tunnelling mechanism.

17. A matrix multiplexed display as claimed in claim 1 in which said gross change in resistivity of the insulating layer results from a trap depth modulation mechanism.

18. A matrix multiplexed display as claimed in claim 1 in which the gross change is resistivity of said insulating layer results from the combination of a tunnelling mechanism and a trap depth modulation mechanism.

19. A matrix multiplexed display as claimed in claim 1 in which the picture elements and switches are arranged in rows and columns, the metal layer at one side of each switch being in the form of first and second distinct regions, first lead means for electrically connecting each of said first regions to a series connected picture element, second lead means for electrically connecting said second regions together in rows, and third lead means electrically connecting the electrodes on the other plate in columns.

20. In a method of fabricating a display, the steps of: depositing onto a transparent plate a row-column array of thin film metal regions, each region constituting a first terminal of a switch;
anodizing said metal regions thereby forming a dielectric layer on said metal regions;
forming a thin film conducting region over said anodized regions, the conducting regions forming a second terminal of respective switches;
forming a corresponding array of transparent electrodes on the plate;
forming a plurality of thin film leads parallel to the rows;
forming thin film interconnects between one terminal of each switch and the electrode adjacent thereto;
forming thin film interconnects between the other terminal of each switch and the row leads whereby to interconnect the switches in rows;
forming a corresponding array of transparent electrodes on a second transparent plate;
forming a plurality of thin film leads parallel to the columns on the second plate;
forming thin film interconnects between the electrodes and the column leads to interconnect the electrodes on said second plate in columns; and
sealing between the plates a liquid having electic field related optical characteristics.

21. In a method of fabricating a display the steps of:
depositing onto one transparent plate a row-column array of thin film metal regions, each region constituting first terminals of a pair of switches;
anodizing said metal region;
forming spaced conducting regions on each anodized region, the conducting regions forming second terminals of the pair of switches;
forming a corresponding array of transparent electrodes on the plate;
forming a plurality of thin film leads parallel to the rows;
forming thin film interconnects between the second terminal of one switch of each pair and the electrode adjacent thereto;
forming thin film interconnects between the second terminal of the other switch of each pair a lead adjacent thereto whereby to interconnect the switches in rows;
forming a corresponding array of transparent electrodes on a second transparent plate;
forming a plurality of thin film leads parallel to the column;
forming thin film interconnects between the electrodes and the column leads to interconnect the electrodes in columns on the second plate; and
sealing between the plates a liquid having electric field related optical characteristics.

22. A method as claimed in claim 20 or 21 in which at least some of the conducting regions electrically connected to the second terminal of each switch are deposited simultaneously as a single homogeneous layer.

23. A method as claimed in claim 20 in which at least some of the conducting regions electrically connected to the first terminal of each switch are deposited simultaneously as a single homogenous layer.

24. A matrix multiplexed display as claimed in claim 1 in which at least one of the thin film conducting layers is a thin film metal layer.

* * * * *

REEXAMINATION CERTIFICATE (1480th)
United States Patent [19]
Baraff et al.

[11] B1 4,413,883
[45] Certificate Issued     Jun. 4, 1991

[54] DISPLAYS CONTROLLED BY MIM SWITCHES OF SMALL CAPACITANCE

[75] Inventors: David R. Baraff, Ottawa; Nur M. Serinken, Kanata; Richard W. Streater, Nepean; Carla J. Miner, Nepean; Robert J. Boynton, Nepean; Blair K. MacLaurin, Nepean; William D. Westwood, Nepean, all of Canada

[73] Assignee: Northern Telecom Limited

Reexamination Request:
No. 90/002,019, May 7, 1990

Reexamination Certificate for:
Patent No.: 4,413,883
Issued: Nov. 8, 1983
Appl. No.: 212,271
Filed: Dec. 3, 1980

Related U.S. Application Data

[63] Continuation-in-part of Ser. No. 44,247, May 31, 1979, abandoned.

[51] Int. Cl.$^5$ ............................................. G02F 1/133
[52] U.S. Cl. .................................. 350/334; 350/333; 350/339 R
[58] Field of Search ........... 350/332, 333, 334, 339 R, 350/356, 357; 340/784

[56] References Cited

U.S. PATENT DOCUMENTS

| | | | |
|---|---|---|---|
| 3,714,374 | 1/1973 | Sobel | 358/241 |
| 3,725,899 | 4/1973 | Greubel | 340/784 |
| 3,765,011 | 10/1973 | Sawyer et al. | 340/793 |
| 3,824,003 | 7/1974 | Koda et al. | 350/333 |
| 3,862,360 | 1/1975 | Dill et al. | 358/230 |
| 4,233,603 | 11/1980 | Castleberry | 340/784 |

OTHER PUBLICATIONS

Japanese laid-open publication No. 73895/76 for "Liquid Crystal Display Device", published Jun. 26, 1976 (Nomura, et al.).

Japanese laid-open utility model publication No. 76648/74 for "Electrode Structure For A Liquid Crystal Display Apparatus", published Jul. 3, 1974 (K. Kobayashi).

Japanese laid-open publication No. 34794/75 for "The Matrix Arrangement For Driving An Optical Element", published Apr. 3, 1975 (K. H. Gaier, et al.).

1969 IEEE International Solid-State Circuits Conference, Feb. 16, 1969, pp. 52-53, "Liquid Crystal Matrix Displays", B. J. Lechner, et al.

Pertinent Concepts in Computer Graphics, Second National Conference, Mar. 30, 1969, "Liquid Crystal Displays", Paper No. 4827, B. J. Lechner.

Proceedings of the IEEE, vol. 59, No. 11, Nov. 1971, pp. 1566-1579, "Liquid Crystal Matrix Displays", B. J. Lechner et al.

IEEE Transactions on Electron Devices, vol. ED-20, No. 11 Nov. 1973, pp. 995-1001, "A 6×6 Inch 20 Lines-per-Inch Liquid-Crystal Display Panel", T. P. Brody et al.

Proceeding of the S.I.D., vol. 19/2, Second Quarter 1978, pp. 63-67, "Alphanumeric And Video Performance Of A 6"×6" 30 Lines Per Inch Thin Film Transistor-Liquid Crystal Display Panel", F. C. Luo, et al.

1978 Biennial Display Research Conference, pp. 42-43, "Varistor Controlled Multiplexed Liquid Crystal Display", D. E. Castleberry.

Japanese laid-open publication No. 52-149090 for "Liquid Crystal Display Device", published Dec. 10, 1977 (Nomura).

IEEE Transactions On Electron Devices, vol. ED-26, No. 8, Aug. 1979, pp. 1123-1128, "Varistor-Controlled Liquid-Crystal Displays", D. E. Castleberry.

*Primary Examiner*—S. D. Miller

[57] ABSTRACT

A matrix multiplexed field effect display has switch devices at matrix crosspoints to provide a turn-on threshold for the field effect material. The switch devices are thin film metal-insulator-metal (MIM) switches. The display is operated at low current so that the MIM switches, which may be deposited on glass, do not degrade rapidly in use.

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the tent, but has been deleted and is no longer a part of the tent; matter printed in italics indicates additions made the patent.

AS A RESULT OF REEXAMINATION, IT HAS BEEN DETERMINED THAT:

The patentability of claims 20–23 is confirmed.

Claims 2, 3 and 5 are cancelled.

Claims 1, 4, 18 and 19 are determined to be patentable amended.

Claims 6–17 and 24, dependent on an amended claim, e determined to be patentable.

New claim 25 is added and determined to be patentle.

1. A matrix multiplexed display comprising a pair of ates, at least one of the plates being transparent, the ates having sealed therebetween a layer of liquid charterized by electric field dependent optical transmisrity, a first plurality of electrodes on an inside surface one plate and a second plurality of electrodes on an side surface of the other plate, the display having a urality of picture elements, each element defined by a ir of opposed electrodes on the inside surfaces of spective plates, means for applying a voltage between e opposed electrodes of each element, each picture ement being series connected to a respective switch imprising a thin insulating film flanked by thin film *etallic* conducting layers, the insulating film characrized by a gross change in resistivity at a predetermined voltage thereacross, the switches *being* formed *1* the inside surface of at least one of the plates, *each itch being laterally offset from and immediately adjant to the picture element connected in series thereto, each itch being substantially smaller in area than the picture ement connected in series thereto whereby* each switch having] *has* a capacitance substantially less than the ipacitance of its series connected picture element.

4. A matrix multiplexed display as claimed in claim 2] *1* in which [each picture element and its series connected switch are superimposed,] one [picture element] electrode [having] *of each picture element has* a part extending *laterally* therefrom to provide a relatively small contact area with the switch insulating film.

18. A matrix multiplexed display as claimed in claim 1 in which the gross change [is] *in* resistivity of said insulating layer results from the combination of a tunnelling mechanism and a trap depth modulation mechanism.

19. A matrix multiplexed display as claimed in claim [1] *24* in which the picture elements and switches are arranged in rows and columns, the metal layer at one side of each switch being in the form of first and second distinct regions, first lead means for electrically connecting each of said first regions to a series connected picture element, second lead means for electrically connecting said second regions together in rows, and third lead means electrically connecting the electrodes on the other plate in columns.

25. *A matrix multiplexed display, comprising:*
   *first and second plates, at least one of the plates being transparent;*
   *a layer of liquid sealed between respective inside surfaces of the plates, the liquid characterized by an optical transmission characteristics which depend on an electric field applied to the liquid;*
   *a first array of electrodes on the inside surface of the first plate, the first array of electrodes being electrically connected in a plurality of columns;*
   *a second array of electrodes on the inside surface of the second plate, each electrode of the second array being aligned with a corresponding electrode of the first array, each electrode of the second array together with its corresponding electrode of the first array and the layer of liquid therebetween defining a respective picture element of the matrix multiplexed display; and*
   *an array of MIM switching devices on the inside surface of the second plate, each MIM switching device being laterally offset from and immediately adjacent to a corresponding electrode of the second array, and having a first terminal which is electrically connected in series with the corresponding electrode of the second array and a second terminal, the second terminals of the MIM switches being electrically connected in a plurality of rows, each MIM switching device having an area substantially smaller in area than the respective electrode of the second array to which it is connected in series whereby each MIM switching device has a substantially smaller capacitance than the respective picture element to which it is connected in series.*

* * * * *